United States Patent
Holveck et al.

(10) Patent No.: US 11,670,945 B1
(45) Date of Patent: Jun. 6, 2023

(54) POWER OPTIMIZERS IN SERIES WITH VOLTAGE SENSORS AND A COMMON REFERENCE SIGNAL

(71) Applicant: Lunar Energy, Inc., Mountain View, CA (US)

(72) Inventors: Mark Holveck, Sunnyvale, CA (US); Randol Aikin, Piedmont, CA (US); Craig Patrick Timms, San Francisco, CA (US)

(73) Assignee: Lunar Energy, Inc., Mountain View, CA (US)

( * ) Notice: Subject to any disclaimer, the term of this patent is extended or adjusted under 35 U.S.C. 154(b) by 0 days.

(21) Appl. No.: 17/964,699

(22) Filed: Oct. 12, 2022

Related U.S. Application Data

(60) Provisional application No. 63/314,975, filed on Feb. 28, 2022.

(51) Int. Cl.
   *H02J 3/46*    (2006.01)
   *H02S 30/10*   (2014.01)
   *H02J 3/38*    (2006.01)

(52) U.S. Cl.
   CPC .............. *H02J 3/46* (2013.01); *H02J 3/381* (2013.01); *H02S 30/10* (2014.12); *H02J 2300/24* (2020.01)

(58) Field of Classification Search
   CPC .......... H20J 3/381; H20J 3/46; H20J 2300/24; H02S 30/10
   USPC ........................................................ 307/84
   See application file for complete search history.

(56) References Cited

U.S. PATENT DOCUMENTS

| | | | |
|---|---|---|---|
| 7,605,498 | B2 | 10/2009 | Ledenev |
| 7,719,140 | B2 | 5/2010 | Ledenev |
| 8,823,218 | B2 | 9/2014 | Hadar |
| 8,922,061 | B2 | 12/2014 | Arditi |
| 8,933,321 | B2 | 1/2015 | Hadar |
| 9,106,105 | B2 | 8/2015 | McCaslin |
| 9,584,021 | B2 | 2/2017 | Avrutsky |
| 9,673,630 | B2 | 6/2017 | Ledenev |
| 9,812,869 | B2 | 11/2017 | Narla |
| 9,923,379 | B2 | 3/2018 | Narla |
| 9,941,421 | B2 | 4/2018 | Dunton |
| 9,966,848 | B2 | 5/2018 | Avrutsky |
| 10,256,770 | B2 | 4/2019 | Hadar |
| 10,333,405 | B2 | 6/2019 | Avrutsky |
| 10,608,437 | B2 | 3/2020 | Ledenev |
| 10,886,746 | B1 | 1/2021 | Ledenev |

(Continued)

*Primary Examiner* — Hal Kaplan
(74) *Attorney, Agent, or Firm* — Van Pelt, Yi & James LLP

(57) ABSTRACT

A common reference signal is used by a plurality of serially-connected power optimizers to manage a plurality of photovoltaic panels. It is determined whether an individual voltage output exceeds an individual limit. If so, a corresponding photovoltaic panel in the plurality of photovoltaic panels is adjusted to reduce the individual voltage output and the combined voltage output, where the combined voltage output is based at least in part on (a) the individual voltage output and (2) at least one other individual voltage output associated with another power optimizer. It is determined whether the combined voltage output relative to the common reference signal exceeds a maximum offset. If so, the corresponding photovoltaic panel in the plurality of photovoltaic panels is adjusted to reduce the individual voltage output and the combined voltage output.

14 Claims, 10 Drawing Sheets

(56) References Cited

U.S. PATENT DOCUMENTS

| | | |
|---|---|---|
| 11,070,062 B2 | 7/2021 | Ledenev |
| 11,070,063 B2 | 7/2021 | Ledenev |
| 11,289,917 B1 | 3/2022 | Ledenev |
| 2018/0309300 A1* | 10/2018 | Dai .......................... H02J 3/38 |

* cited by examiner

POWER OPTIMIZERS IN SERIES WITH VOLTAGE SENSORS AND A COMMON REFERENCE SIGNAL

CROSS REFERENCE TO OTHER APPLICATIONS

This application claims priority to U.S. Provisional Patent Application No. 63/314,975 entitled RAPID SHUTDOWN filed Feb. 28, 2022 which is incorporated herein by reference for all purposes.

BACKGROUND OF THE INVENTION

Power optimizers are used to control and/or manage photovoltaic (PV) panels. More specifically, a power optimizer adjusts the configurations of the PV panel (e.g., the voltage the PV panel is at) to optimize the power generated by the PV panel. Oftentimes there is an array of PV panels and each PV panel has its own associated power optimizer so that each PV panel can be configured and/or optimized independently of other PV panels. In many applications, the power generated by the array of PV panels is sent by the power optimizers to an energy storage system (ESS). A potential issue arises if power consumption (e.g., by residential loads in the home and/or the power grid) does not keep up with power generation. New techniques for detecting and adapting to such a state that are more reliable and/or adaptable than existing solutions would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a technique to have a plurality of power optimizers that are connected together in series to manage a plurality of photovoltaic (PV) panels using a common reference signal are described herein. In some embodiments, each power optimizer compares its combined output voltage against the common reference signal to ensure that the difference does not exceed a maximum offset (e.g., where the value of the combined output voltage depends on where a given power optimizer is in the serial connection of power optimizers). The power optimizer also checks to ensure that the individual output voltage (e.g., the value of which is independent of a given power optimizer's position within the serial connection) does not exceed an individual limit. As will be described in more detail below, this management technique avoids some vulnerabilities and/or drawbacks associated with other management techniques, such as a vulnerability to lost communications and/or an inability to optimize power generation in certain conditions.

Figure 1:
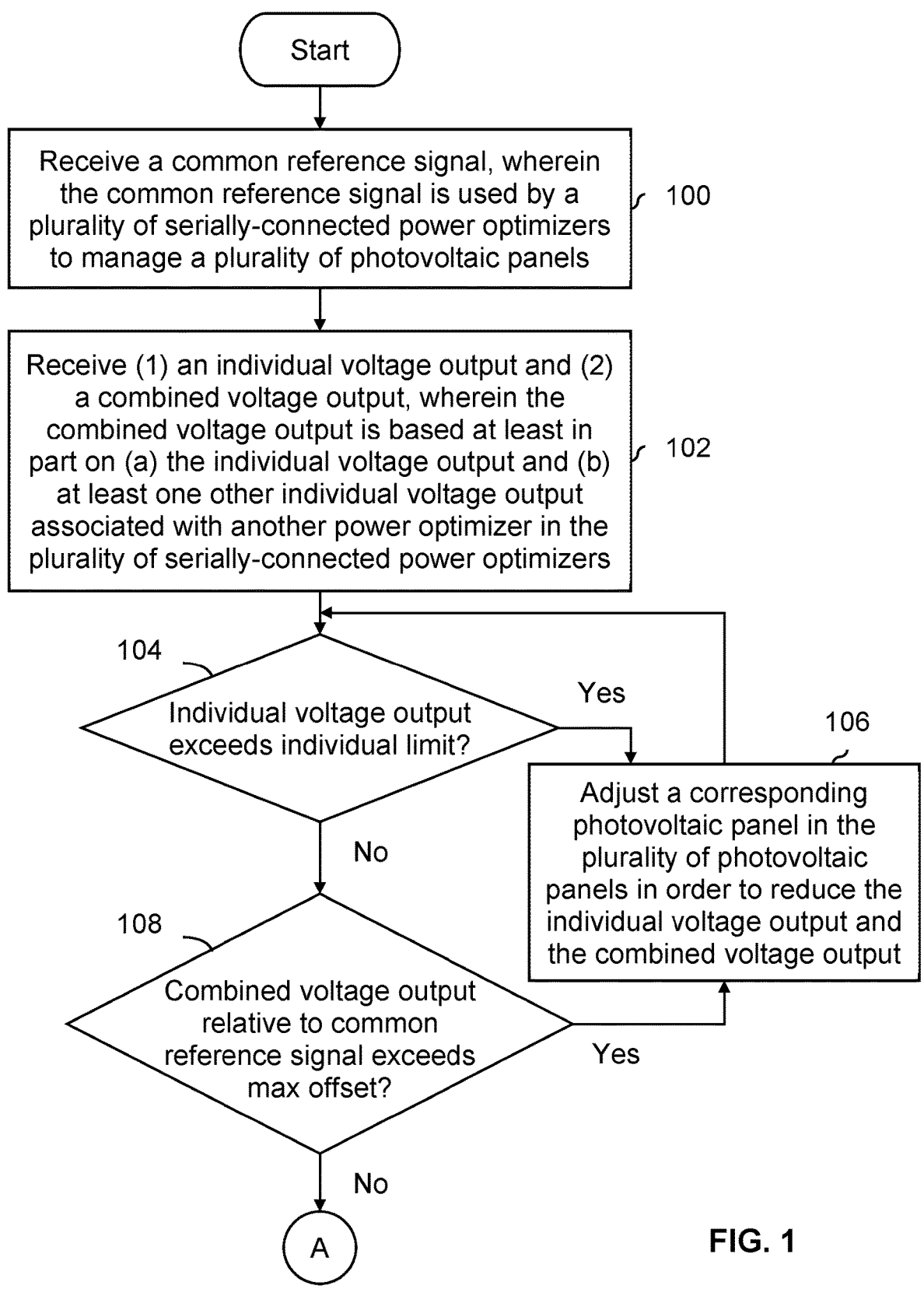
FIG. 1 is a flowchart illustrating an embodiment of a process to manage a plurality of photovoltaic (PV) panels using a common reference signal.

FIG. 1 is a flowchart illustrating an embodiment of a process to manage a plurality of photovoltaic (PV) panels using a common reference signal. In some embodiments, the process is performed (e.g., independently) by each of a plurality of serially-connected power optimizers where each of the serially-connected power optimizers (e.g., independently) manages a corresponding photovoltaic panel. A more general term for a power optimizer is a module-level power electronics (MLPE) but for convenience the terms "optimizer" or "power optimizer" are used herein.

At 100, a common reference signal is received, wherein the common reference signal is used by a plurality of serially-connected power optimizers to manage a plurality of photovoltaic panels. As indicated by the name, the common reference signal is common to all of the serially-connected power optimizers and is used as a reference signal to manage an array (i.e., plurality) of PV panels (e.g., keep an individual output voltage as well as a combined output voltage at their current voltages, increase the voltages, or decrease the voltages).

In some embodiments, the common reference signal is a ground signal. For example, in some applications, this may be convenient because the PV panels may be required to have a ground signal or line for safety reasons. In some embodiments, the power optimizer includes a metal mounting tab that is configured to be bolted to a grounded frame of a corresponding photovoltaic panel and the common reference signal includes a ground signal that is received via the metal mounting tab and the grounded frame. In some cases, a PV panel's frame is not grounded (e.g., the frame of the PV panel is made of plastic or some other material that is a poor electrical conductor) and the PV panel is instead grounded through a grounding wire. In some such embodiments, the power optimizer includes a screw terminal that is configured to be coupled to a grounding wire and the common reference signal includes a ground signal that is received via the screw terminal and the grounding wire.

In some embodiments, the common reference signal is based on or otherwise includes a signal associated with a DC bus, such as the DC bus midpoint (e.g., a signal that corresponds to the midpoint, or average of the positive terminal and negative terminal, of a DC bus). Such a DC bus may, for example, be connected on the DC side of an inverter in an electrical storage system (ESS). In some embodiments, the plurality of serially-connected power optimizers output the energy generated by the PV panels to the DC bus.

At 102, (1) an individual voltage output and (2) a combined voltage output are received, wherein the combined voltage output is based at least in part on (a) the individual voltage output and (b) at least one other individual voltage output associated with another power optimizer in the plurality of serially-connected power optimizers.

As used herein, an individual voltage output refers to the voltage that is output by a (given) power optimizer and varies based upon the current settings and/or configurations of the corresponding PV panel (e.g., where those settings and/or configurations are controlled by the power optimizer) and the amount and/or properties of the sunlight that hits the PV panel. The individual voltage output is (in general) independent of where a given power optimizer is located within the serial connection of power optimizers. That is, the individual voltage output is the same regardless of whether a given power optimizer is at one of the ends of the serially-connected power optimizers versus being in the middle (e.g., excluding any extreme electrical situations).

The combined voltage output is based on the (e.g., corresponding) individual voltage output as well as the position of the power optimizer within the serially-connected power optimizers. More detailed examples of combined voltage outputs are described below.

At 104, it is determined whether the individual voltage output exceeds an individual limit. In some embodiments, the individual limit is set to a relatively high value that acts as an absolute maximum value for the voltage that is output by a power optimizer.

In the event it is determined at 104 that the individual voltage output does exceed the individual limit, at 106, a corresponding photovoltaic panel in the plurality of photovoltaic panels is adjusted in order to reduce the individual voltage output and the combined voltage output. For example, by reducing the individual voltage output, the combined voltage output is likewise reduced because the combined voltage output is based on the individual voltage output. After performing the adjustment at 106, the decision at 104 is performed again.

As will be described in more detail below, the serially-connected power optimizers may be connected in parallel to an electrical storage system (ESS) which includes capacitor arrays and other electronic components that may be damaged by (e.g., excessively) high voltages when there is nowhere for the energy generated by the PV panels to go (e.g., the batteries in the ESS are full and the load(s) in the system are not keeping up with generation). Adjusting the PV panels to reduce the various voltages that are output by the plurality of power optimizers (e.g., at 106 in FIG. 1) prevents damage to the capacitor arrays and other vulnerable electronic components. Some other benefits and/or advantages are described in more detail below.

Returning to the decision at 104, if it is determined that the individual voltage output does not exceed the individual limit at 104, at 108, it is determined whether the combined voltage output relative to the common reference signal exceeds a maximum offset. To describe the decision at 108 another way, the combined voltage output should not be above (below) the common reference signal by the amount specified by the maximum offset. In some embodiments, the common reference signal is not at a fixed voltage and as the common reference signal shifts up (down) in voltage, the maximum (minimum) voltage that the combined voltage output is permitted to be at will similarly shift up (down).

In the event it is determined at 108 that the combined voltage output relative to the common reference signal exceeds the maximum offset, at 106, a corresponding photovoltaic panel in the plurality of photovoltaic panels is adjusted in order to reduce the individual voltage output and the combined voltage output.

Otherwise, if it is determined at 108 that the combined voltage output relative to the common reference signal does not exceed the maximum offset, the process ends.

Although not necessarily shown in this example, in some embodiments, the process of FIG. 1 is periodically or continuously run. For example, the environmental conditions experienced by the PV panels may change over time and the example process may be periodically performed by the power optimizers to respond to (as an example) changes in the sunlight received by the PV panels.

The following figure illustrates an example system that performs the process of FIG. 1 and illustrates some benefits of the technique.

Figure 2:
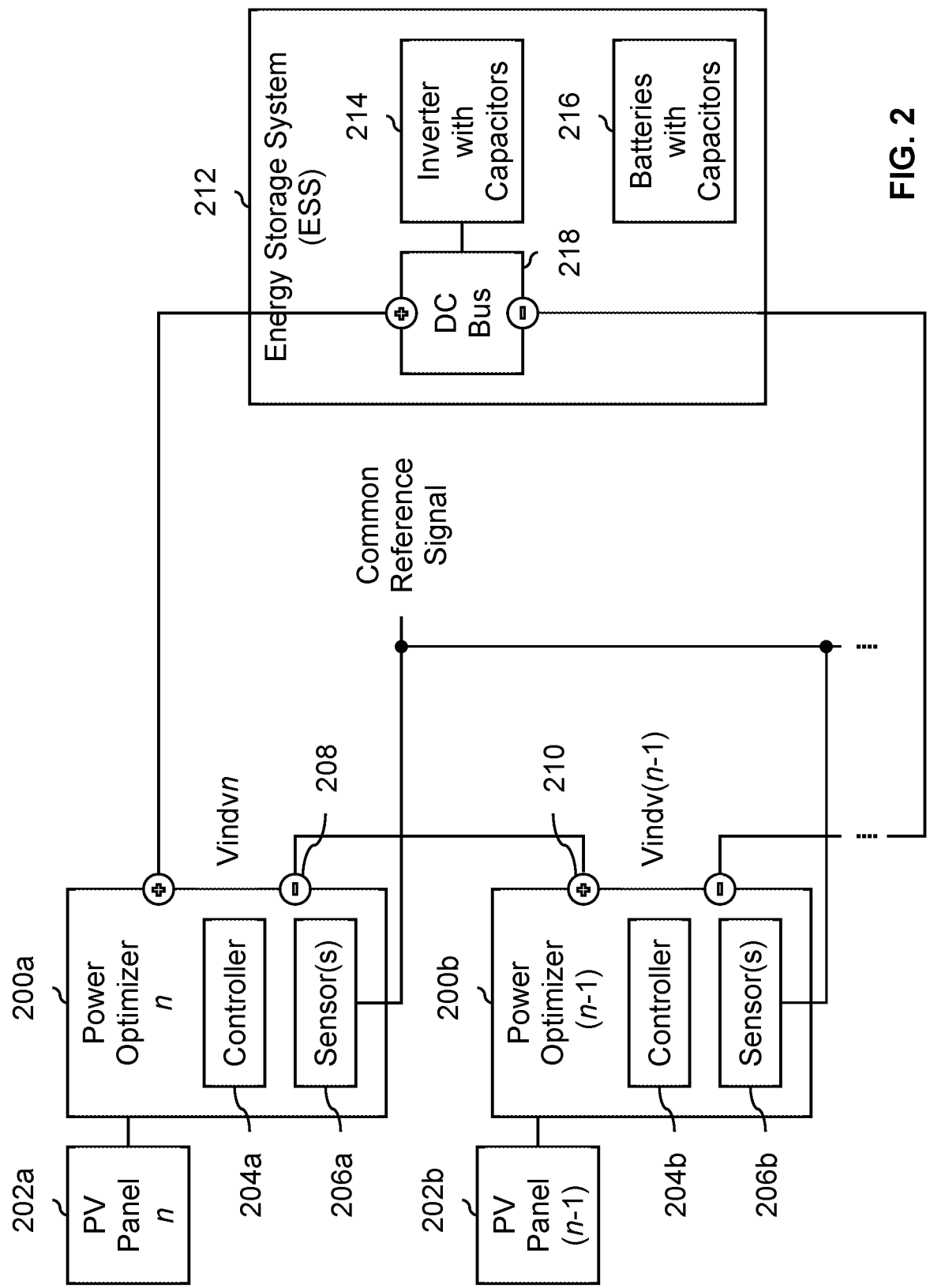
FIG. 2 is a diagram illustrating an embodiment of a plurality of serially-connected power optimizers that manages a plurality of photovoltaic (PV) panels and is connected to an energy storage system (ESS).

FIG. 2 is a diagram illustrating an embodiment of a plurality of serially-connected power optimizers that manages a plurality of photovoltaic (PV) panels and is connected to an energy storage system (ESS). To preserve the readability of the diagram, some connections and/or components are not necessarily shown.

In this example, there are n power optimizers connected together in series, including the topmost $n^{th}$ power optimizer (200a) and the second-from-top $(n-1)^{th}$ power optimizer (200b), where the negative (output) terminal (208) of the $n^{th}$ power optimizer (200a) is connected to the positive (output) terminal (210) of the (n−1)$^{th}$ power optimizer (200b) and so on. The n$^{th}$ and (n−1)$^{th}$ power optimizers (200a and 200b) are respectively connected to and respectively manage the n$^{th}$ and (n−1)$^{th}$ PV panels (202a and 202b). Depending upon the sunlight received by a PV panel and the current settings of PV panels (e.g., the voltage that the PV panel is running at), a different amount of energy may be generated. In general, each power optimizer's individual voltage output is proportional to the power generated relative to the other power optimizers (e.g., if all of the power optimizers are generating the same amount of power, they will have the same individual voltage output). In this example, the individual voltage outputs of the n$^{th}$ power optimizer (200a) and (n−1)$^{th}$ power optimizer (200b) are Vindvn and Vindv(n−1), respectively.

The energy generated by a given PV panel (e.g., 202a) is passed along to the rest of the system by a corresponding power optimizer (e.g., 200a). In this example, the outputs of the power optimizers (200a and 200b) are in the DC domain and are attached to the DC bus (218), which is located on the DC side of the inverter (214) in the ESS (212). For example, the inverter (214) manages the flow of electricity back and forth between a DC side (e.g., in the form of the DC bus (218) to which DC devices are attached such as the power optimizers, the DC interface of the inverter, etc.) and an AC side (e.g., in the form of an AC bus (not shown) to which AC devices are attached such as a breaker panel to the grid, the AC interface of the inverter, etc.). The power optimizers (200a and 200b) "dump" energy from the PV panels (202a and 202b) into the DC bus (218). Attaching the PV panels and power optimizers to a DC part of the system may be more efficient and/or less expensive than connecting the PV panels and/or power optimizers to an AC part of the system.

Each power optimizer (200a and 200b) includes one or more (e.g., voltage) sensors (206a and 206b) and a controller (204a and 204b). In some embodiments, the sensors (206a and 206b) receive signals, measure the voltages on those signals, and output the (e.g., quantified) values of those voltages (e.g., the value of the combined output voltage, the value of the individual output voltage, etc.) to the controllers (204a and 204b). In some other embodiments, a sensor calculates or otherwise measures a (voltage) difference between two input signals. The controllers then use those voltage values to do their comparisons and/or decision making. Returning briefly to FIG. 1, the sensors (206a and 206b) are an example of a device that performs steps 100 and 102 and the controllers (204a and 204b) are an example of a device that performs steps 104, 106, and 108.

In one example of steps 104 and 106 in FIG. 1, a controller (e.g., 204a) compares the individual voltage output (e.g., Vindvn) against the individual limit. For example, if the individual limit is 60V and Vindvn=65V then the individual voltage output exceeds the individual limit and the n$^{th}$ power optimizer (200a) will adjust the settings and/or configurations of the n$^{th}$ PV panel (202a) to reduce Vindvn. In general, as the amount of energy produced by a PV panel decreases, the corresponding individual voltage output will similarly decrease.

In one example of step 108 in FIG. 1, the n$^{th}$ sensor (206a) receives the n$^{th}$ combined voltage output (e.g., Vcombn) and the common reference signal and generates a difference between the two and passes that difference to the n$^{th}$ controller (204a). The n$^{th}$ controller then compares the differences against the maximum offset. In one example described in more detail below, the common reference signal is at ground (i.e., 0V), the maximum offset is 400V, and therefore Vcombn (as an example) cannot exceed 400V. If the combined voltage output is "too far" from the common reference signal (e.g., per the maximum offset), then the power optimizer will adjust the settings of the PV panel to reduce the individual voltage output which in turn will reduce the combined voltage output.

Vcombn illustrates an example of a combined voltage output that is based at least in part on an individual voltage output (e.g., Vindvn) and at least one other individual voltage output associated with another power optimizer in the plurality of serially-connected power optimizers. For example, if the negative (output) terminal of the first, bottommost power optimizer (not shown) is connected to ground, then Vcombn=Vindvn+Vindv(n−1)+ . . . +Vindv1.

Similarly, the (n−1)$^{th}$ combined voltage output (i.e., Vcomb(n−1)) is based on its corresponding individual voltage output (i.e., Vcomb(n−1)) and at least one other individual voltage output associated with another power optimizer (e.g., the individual voltage outputs "below" the (n−1)$^{th}$ power optimizer (200b)). Specific example values for the combined voltage output are described in more detail below.

As is shown in this example, in some embodiments, the plurality of serially-connected power optimizers is connected in parallel to a DC bus (e.g., 218) associated with an inverter (e.g., 214) included in an energy storage system (ESS) (e.g., 212) and the common reference signal includes a DC bus midpoint associated with the DC bus.

Managing the PV panels (202a and 202b) in this manner has a number of benefits. One benefit is that it prevents damage to electrical components within the system. For example, ESS (212) includes an inverter (214) and one or more batteries (216), both of which include a variety of capacitors. If the batteries (216) become full and there is nowhere else for the energy generated by the PV panels to go, the total combined voltage output (e.g., passed to the ESS system (212)) will keep growing until it reaches a voltage level that can damage the capacitors or other electronic components in the system. With the power optimizers (e.g., independently) performing the PV panel management techniques described herein, the total combined (output) voltage (e.g., resulting from the in-series connection of the power optimizers) will be prevented from reaching an excessively high voltage level that will damage electronic components in the ESS or elsewhere in the system.

Some other management techniques try to prevent damage due to excessively high voltages using communication-based approaches. In one such other approach, the inverter (214) in the ESS (212) monitors the total combined (output) voltage coming in to the ESS (212) from the serially-connected power optimizers (200a and 200b). If the voltage exceeds some threshold or limit, then the inverter sends a STOP message to one or more of the power optimizers. However, communications-based techniques are vulnerable to lost or unsent messages and if a power optimizer does not receive a STOP message, that power optimizer will not turn off and damage could occur.

Another communication-based approach is to configure the power optimizers to only be "on" if they have recently received an OKAY message from the inverter in the ESS. Again, this is vulnerable to lost or unsent messages. It also introduces more points of failure that could unintentionally shut down some of the PV panels.

Yet another technique is to hardcode each power optimizer with (just) an individual maximum for the individual voltage output. A downside to this approach is that the hardcoded individual maximum oftentimes must be manually configured during installation (e.g., because it is a function of the number of PV panels or power optimizers, such as (total maximum voltage)/n). Any configuration that is done manually is susceptible to human errors. Another downside to this approach is that the hardcoded individual maximum is often calculated when the PV panels are maximum power generation, but this can be unnecessarily limiting as sunlight conditions change. For example, if some of the PV panels become shaded or otherwise receive less sunlight, with the process of FIG. 1 and/or the system of FIG. 2, the power optimizers would have the flexibility to "dial up" energy production at the unshaded PV panels without fear of damage. In contrast, with the hardcoded individual maximum approach, that flexibility is not available and energy production would be suboptimal. The following figures describe an example of this.

Figure 3A:
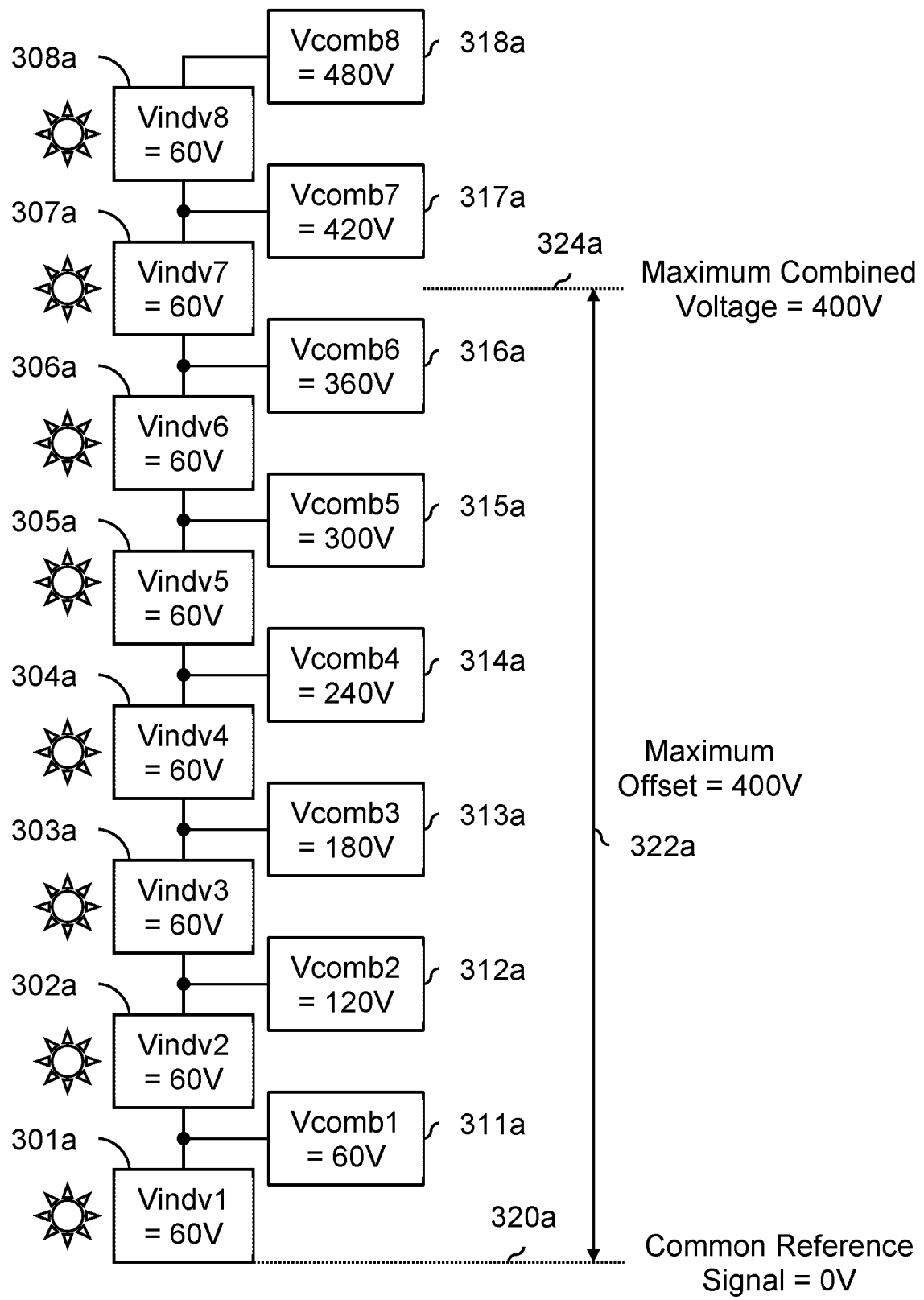
FIG. 3A is a diagram illustrating an embodiment at a first point in time of eight serially-connected power optimizers that use a common reference signal at ground.

FIG. 3A is a diagram illustrating an embodiment at a first point in time of eight serially-connected power optimizers that use a common reference signal at ground. In this example, eight power optimizers are connected together in series, as shown in FIG. 2. To preserve the readability of this diagram, the power optimizers and PV panels are not shown, but the various individual voltage outputs (301a-308a) and combined voltage outputs (311a-318a) are shown. In this example, all of the individual voltage outputs (301a-308a) are positive voltages. For example, the negative terminal of the bottommost power optimizer may be connected to ground.

In the state shown here, all of the PV panels are receiving optimal sunlight and so the corresponding power optimizers are outputting individual voltage outputs (301a-308a) that are at an individual limit, which in this example is 60V. In FIG. 1, for example, this corresponds to the check at 104, where the individual limit at 104 is set to 60V and a given power optimizer would adjust the settings of the corresponding PV panel to reduce the individual voltage output if that 60V limit were exceeded at 106. As a result, all of the individual voltage outputs (i.e., Vindv1 (301a)-Vindv8 (308a)) are at 60V.

The individual voltage outputs (301a-308a) affect the values of the combined voltage outputs (311a-318a). Vcomb1=60V (311a), Vcomb2=120V (312a), Vcomb3=180V (313a), and so on up to Vcomb8=480V (318a). In the state shown here, the check at 104 in FIG. 1 and any resulting adjustment at 106 has been completed, but the check at 108 and any resulting adjustment at 106 has not yet been performed. As such, Vcomb8 (318a) is (for now) at 480V and Vcomb7 (317a) is (for now) at 420V.

The common reference signal (320a) in this example is set to ground (i.e., 0V) and the maximum offset (322a) is 400V. The maximum combined voltage (324a), which is the sum of these two values, is therefore 400V in this example.

As described above, each of the power optimizers will check whether their combined voltage output (311a-318a) relative to the common reference signal (320a) exceeds the maximum offset (322a). In FIG. 1, for example, this is the check at 108. All of the combined voltage outputs pass this test except for Vcomb7 (317a) which is at 420V and Vcomb8 (318a) which is at 480V. As a result, the top two power optimizers will change the settings of the corresponding PV panels to reduce the Vindv1 (307a) and Vindv8 (308a) which causes Vcomb7 (317a) and Vcomb8 (318a) to also go down. The following figure shows the state of the system after this change.

Figure 3B:
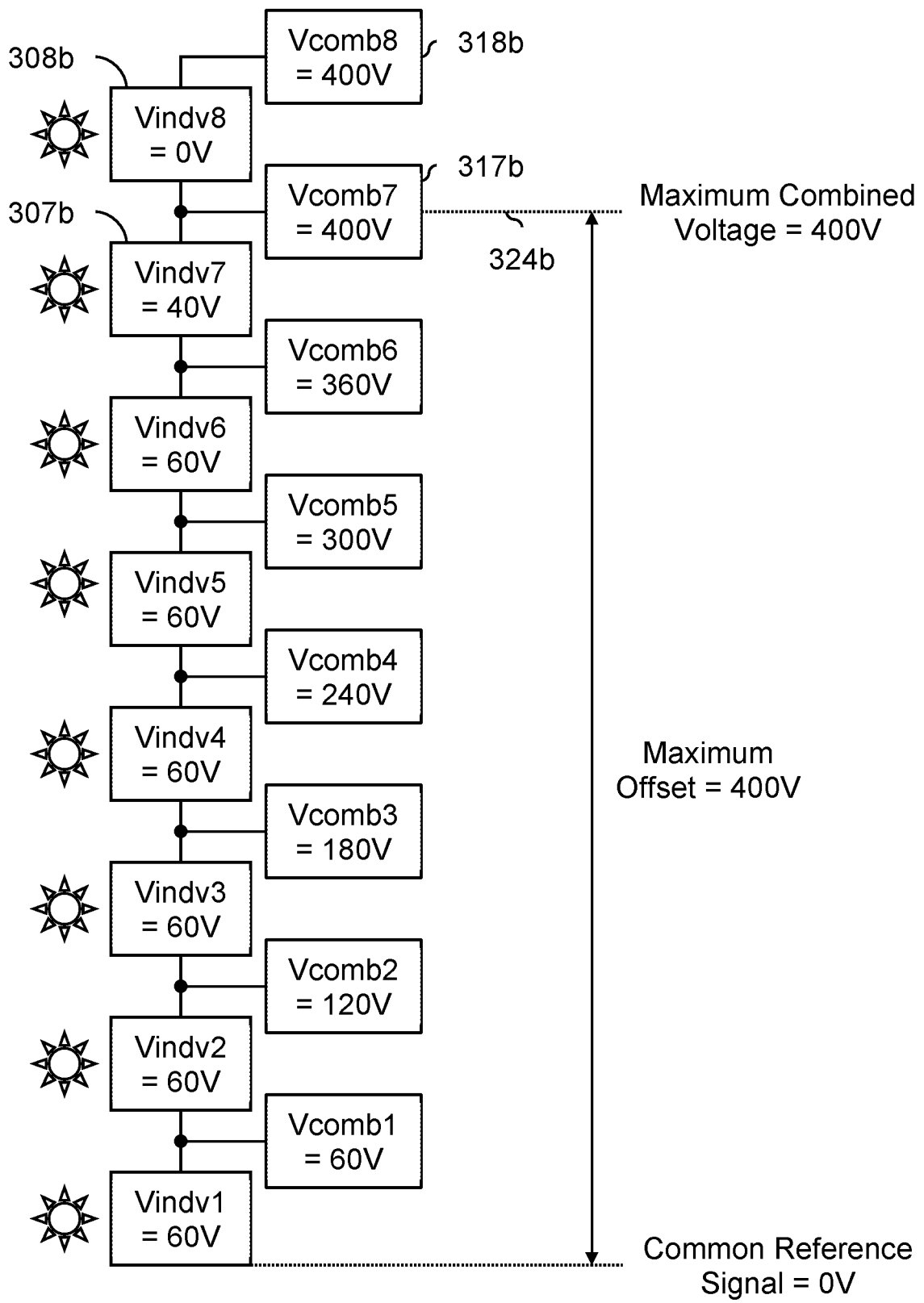
FIG. 3B is a diagram illustrating an embodiment at a second point in time of eight serially-connected power optimizers that use a common reference signal at ground.

FIG. 3B is a diagram illustrating an embodiment at a second point in time of eight serially-connected power optimizers that use a common reference signal at ground. In this example, the second-from-top (i.e., $7^{th}$) power optimizer (not shown) has adjusted its PV panel so that Vindv7 (307b) has been reduced to 40V. This causes Vcomb7 (317b) to go down to 400V which does not exceed the maximum combined voltage (324b) of 400V. Similarly, the topmost (i.e., $8^{th}$) power optimizer (not shown) has adjusted its PV panel so that Vindv8 (308b) reduces to 0V. Vcomb8 (318b) is reduced to 400V due to the changes in Vindv7 (307b) and Vindv8 (308b).

As shown in this example, with the PV panel management techniques described herein, the outermost power optimizer (in this example, the $8^{th}$) is the first one to "pull back" if all of the PV panels are performing robustly. If needed, the next outermost power optimizer (in this case, the $7^{th}$) will also reconfigure its PV panel to "pull back" and so on. As will be described in more detail below, in some embodiments, the common reference signal is at a voltage that is at or near the "midpoint" voltage of the serially-connected power optimizers and the topmost and bottommost power optimizers would "pull back" their PV panels if the (total) combined voltage is too high and potentially causes damage.

As noted previously, the sunlight on the PV panels varies over time and the system should adjust accordingly. The following figure shows the example system at a later point in time when some of the PV panels are shaded.

Figure 3C:
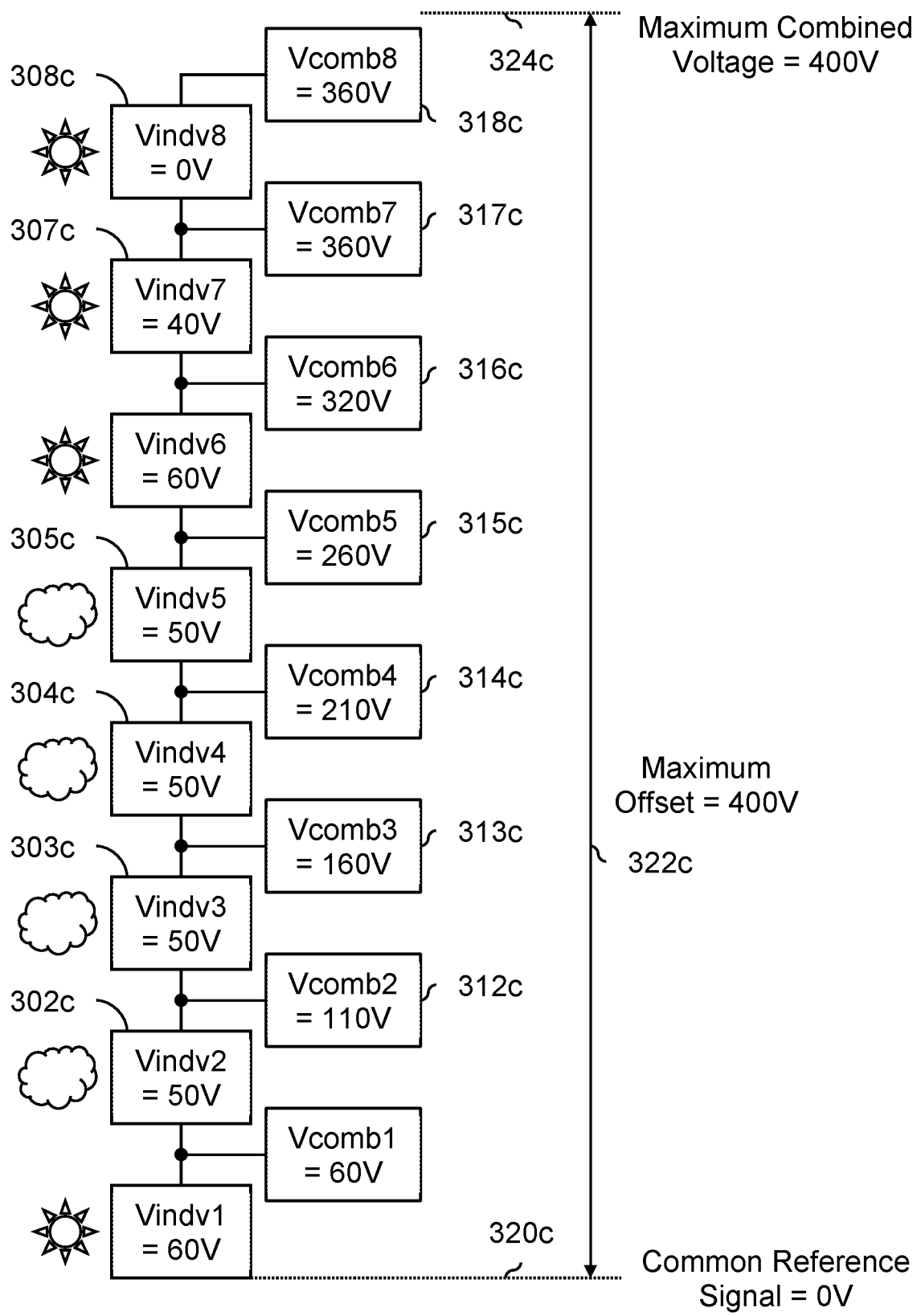
FIG. 3C is a diagram illustrating an embodiment at a third point in time of eight serially-connected power optimizers that use a common reference signal at ground.

FIG. 3C is a diagram illustrating an embodiment at a third point in time of eight serially-connected power optimizers that use a common reference signal at ground. In this example, shadows have appeared over the $2^{nd}$, $3^{rd}$, $4^{th}$, and $5^{th}$ PV panels so that individual voltage outputs Vindv2 (302c) through Vindv5 (305c) are all reduced to 50V. This, in turn, reduces some of the combined voltage outputs so that Vcomb2=110V (312c), Vcomb3=160V (313c), Vcomb4=210V (314c), Vcomb5=260V (315c), Vcomb6=320V (316c), Vcomb7=360V (317c), and Vcomb8=360V (318c).

As a result, Vcomb7 (317c) is at 360V and Vcomb8 (318c) is at 360V which are now both less than the maximum combined voltage (324c) of 400V. The $7^{th}$ and $8^{th}$ power optimizers can now adjust the settings of their PV panels to increase their individual voltage outputs, Vindv7 (307c) and Vindv8 (308c). The following figure shows an example of this.

Figure 3D:
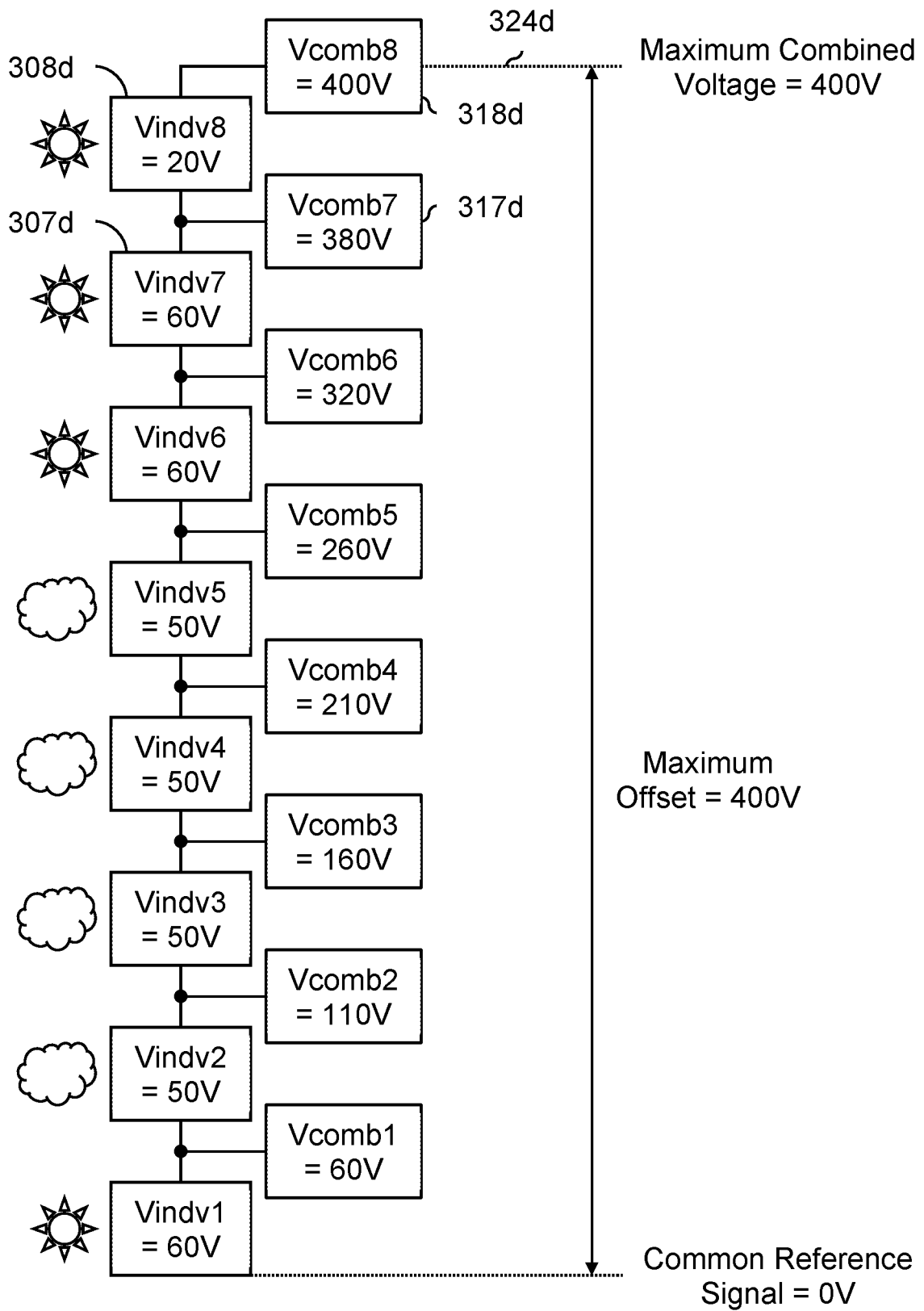
FIG. 3D is a diagram illustrating an embodiment at a fourth point in time of eight serially-connected power optimizers that use a common reference signal at ground.

FIG. 3D is a diagram illustrating an embodiment at a fourth point in time of eight serially-connected power optimizers that use a common reference signal at ground. In this example, the $7^{th}$ power optimizer (not shown) has "dialed up" its PV panel so that Vindv7=60V (307d) and likewise the $8^{th}$ power optimizer (not shown) has done the same for its PV panel so that Vindv8=20V (308d). This increases Vcomb7 (317d) to 380V and Vcomb8 (318d) to 400V, neither of which exceeds the maximum combined voltage (324d) of 400V.

As shown in the above examples, the systems and/or techniques described herein do not have some of the vulnerabilities and/or drawbacks associated with other systems. For example, the adjustments described in the above example do not rely upon any communication between an inverter (e.g., in an ESS) and a power optimizer, or between one power optimizer and another power optimizer. It is therefore invulnerable to lost or unsent communications.

Also, compared to other management techniques where the maximum individual voltage output is hardcoded, in the above example, the system was able to adapt when some of the PV panels become shaded (see, e.g., FIGS. 3C and 3D). With a hardcoded maximum for the individual voltage outputs, this counterbalancing in response to shading on some of the PV panels could not occur. Furthermore, the management systems and/or techniques described herein do not rely upon manual programming (e.g., of the hardcoded maximum, based on the number of PV panels installed) and it may be easier to subsequently increase the number of PV panels installed (e.g., without having to adjust any settings and/or maximums).

As shown in this example, a power optimizer may adjust a photovoltaic panel to increase the individual voltage output and the combined voltage output in certain conditions. The following figure describes this more generally and/or formally in a flowchart.

Figure 4:
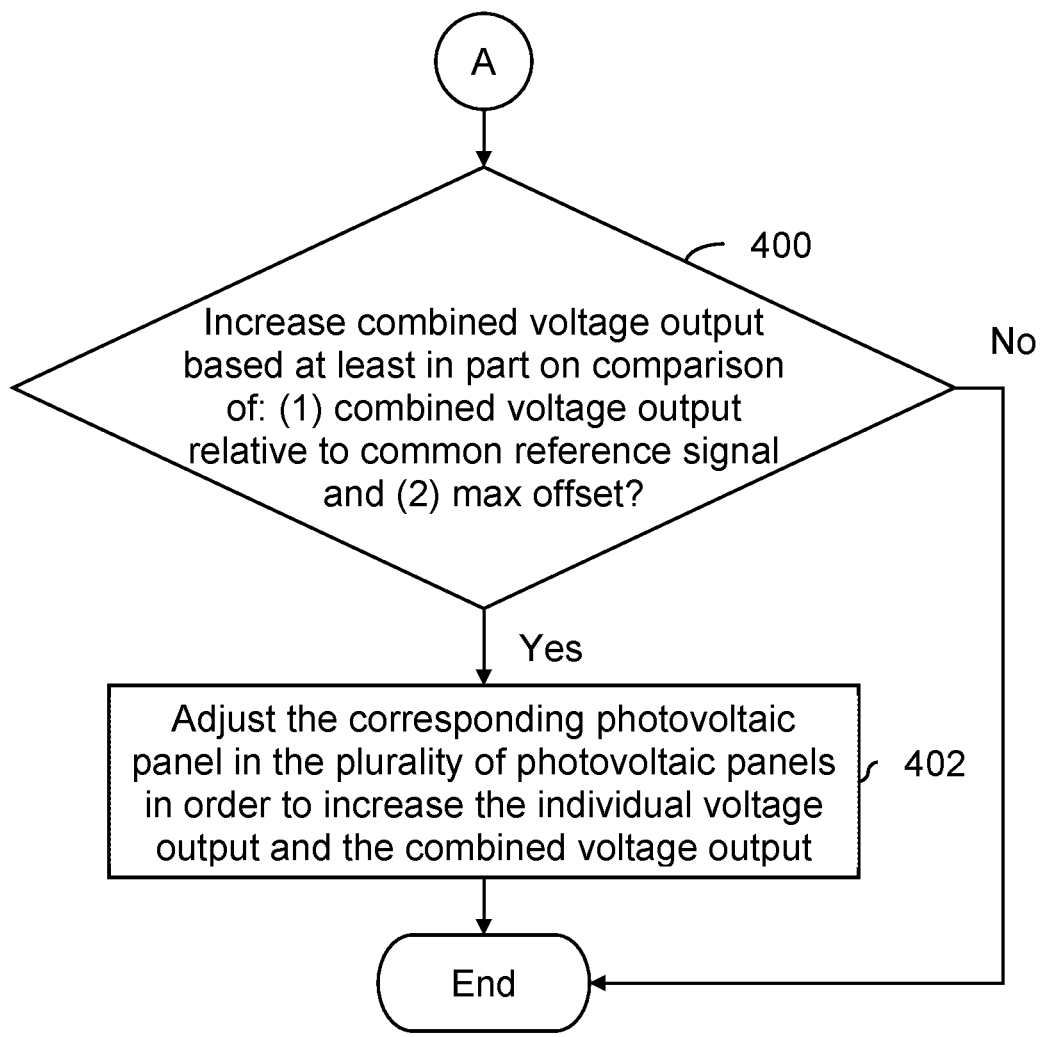
FIG. 4 is a flowchart illustrating an embodiment of a process to increase the individual voltage output and the combined voltage output, if appropriate.

FIG. 4 is a flowchart illustrating an embodiment of a process to increase the individual voltage output and the combined voltage output, if appropriate. In some embodiments, the process of FIG. 4 is performed if the decision at 108 in FIG. 1 is "No." In some embodiments, the process of FIG. 4 is performed (e.g., independently) by each power optimizer in a plurality of serially-connected power optimizers on a periodic basis (e.g., to respond to changes in sunlight, the environment, etc.).

At 400, it is decided whether to increase the combined voltage output based at least in part on a comparison of: (1) the combined voltage output relative to the common reference signal and (2) the maximum offset. For example, in FIG. 3C, when Vcomb7=360V (317c) relative to the common reference signal (320c) at 0V is compared against the maximum offset (322c) at 400V, there is a 40V margin, so it is decided to "dial up" that PV panel and increase Vcomb7 (317c). Similarly, with Vcomb8 (318c) at 360V, there is enough margin to decide to increase Vcomb8 (318c).

In some embodiments, it is decided to increase the combined voltage output at 400 if there is some positive, non-zero difference between (1) the combined voltage output relative to the common reference signal and (2) the maximum offset. Alternatively, in some applications, it may be desirable to have a higher threshold (e.g., a 5V difference) to decide in favor of increasing the individual voltage output (e.g., in case a change in the system is short lived).

If it is decided to increase the combined voltage output at 400, then at 402, the corresponding photovoltaic panel in the plurality of photovoltaic panels is adjusted in order to increase the individual voltage output and the combined voltage output. Otherwise, the process ends.

For example, in FIG. 3D, the $7^{th}$ power optimizer (not shown) has adjusted the settings of its PV panel so that Vindv7 (307d) has increased to 60V which in turn increases Vcomb7 (317d) to 380V. Likewise, the $8^{th}$ PV panel has been reconfigured so that Vindv8 (308d) has increased to 20V and Vcomb8 (318d) has increased to 400V. This produces Vcomb7=380V (317d) and Vcomb8=400V (318d) which are still both below or at the maximum combined voltage (324d) of 400V.

Although the example of FIGS. 3A-3D used a common reference signal at ground, in some embodiments, some other signal (possibly with a varying voltage) is used at the common reference signal. The following figures shown an example of this.

Figure 5A:
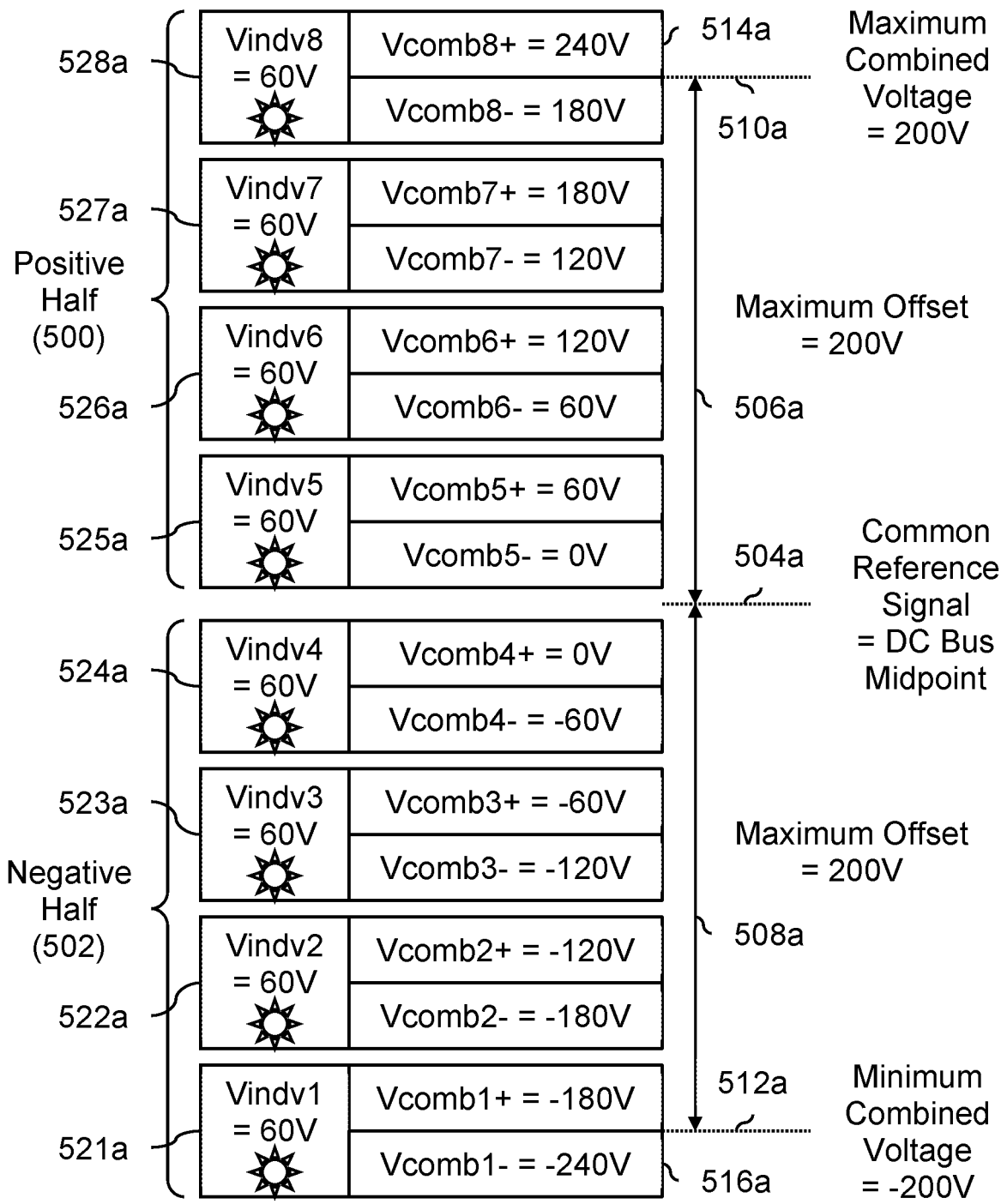
FIG. 5A is a diagram illustrating an embodiment at a first point in time of eight serially-connected power optimizers that use a common reference signal set to a DC bus midpoint.

FIG. 5A is a diagram illustrating an embodiment at a first point in time of eight serially-connected power optimizers that use a common reference signal set to a DC bus midpoint. In this example, there are eight PV panel and power optimizer pairs, where the power optimizers are connected together in series. The upper (i.e., $5^{th}$-$8^{th}$) power optimizers have combined voltage outputs that are positive and are referred to herein as the positive half (500). The lower (i.e., $1^{st}$-$4^{th}$) power optimizers have combined voltage outputs that are negative and are referred to herein as the negative half (502).

In this example, the common reference signal (504a) is a DC bus midpoint (e.g., the average of DCbus+ and DCbus− where DCbus+ and DCbus− are the positive and negative terminals, respectively, of the DC bus (218) in FIG. 2). The DC bus (at least in this example) has a variable voltage so the DC bus midpoint and the common reference signal are also variable. The DC bus midpoint is nominally at 0V but may fluctuate as the voltage of the DC bus changes.

As in the previous example, a limit of 400V across the serially-connected power optimizers is desired to prevent damage to the system. In this example, that corresponds to a maximum offset of 200V, above (506a) and below (508a) the common reference signal (504a). This corresponds to a maximum combined voltage (510a) of 200V and a minimum combined voltage (512a) of −200V. Any voltages beyond those limits (510a and 512a) are not permitted in this example.

As in the previous example, all of the PV panels receive optimal sunlight so individual voltage outputs Vindv1 (521a) through Vindv8 (528a) are their maximums of 60V (e.g., FIG. 1, the individual limit used at 104 is set to 60V). In the state shown here, all of the combined voltage outputs are within the maximum offset (506a and 508a) of 200V (as measured from the common reference signal (504a)) except for the positive terminal of the $8^{th}$ power optimizer (i.e., Vcomb8+ (514a)) which is at 240V and the negative terminal of the $1^{st}$ power optimizer (i.e., Vcomb1− (516a)) which is at −240V. In FIG. 1, for example, the $1^{st}$ and $8^{th}$ power optimizers would fail the test at 108 and would adjust their PV panels at 106 to reduce their individual voltage outputs and combined voltage outputs. The following figure shows the state of the system after the adjustment has been performed.

Figure 5B:
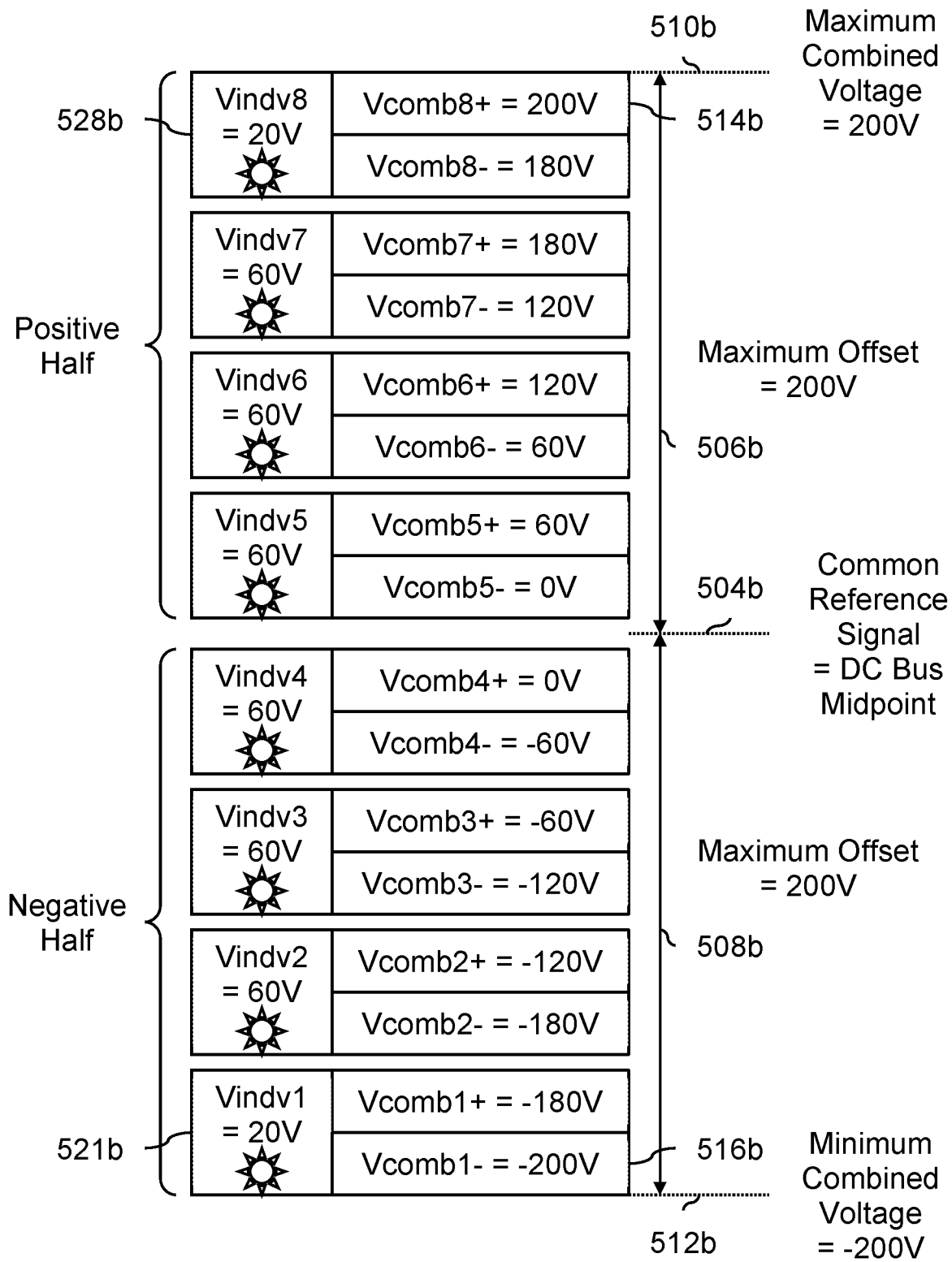
FIG. 5B is a diagram illustrating an embodiment at a second point in time of eight serially-connected power optimizers that use a common reference signal set to a DC bus midpoint.

FIG. 5B is a diagram illustrating an embodiment at a second point in time of eight serially-connected power optimizers that use a common reference signal set to a DC bus midpoint. In this example, the $1^{st}$ power optimizer and $8^{th}$ power optimizer have respectively decreased their individual voltage outputs Vindv1 (521b) and Vindv8 (528b) to 20V. This, in turn, changes Vcomb1− (516b) to be −200V and Vcomb8+ (514b) to be 200V so that both are now within the maximum offset (506b and 508b) of 200V from the common reference signal (504b). To put it another way, Vcomb8+ (514b) at 200V no longer exceeds the maximum combined voltage (510b) at 200V and Vcomb1− (516b) at −200V longer exceeds the minimum combined voltage (512b) at −200V. This, for example, corresponds to the check at 108 in FIG. 1.

In some applications, "dialing down" the power optimizer and PV panel pairs at the "edges" of the serial connection (e.g., by having the common reference signal be at a voltage that is at or near the middle of the serially-connected power optimizers) is desirable because there is redundancy in the adjustment process. If the topmost (i.e., $8^{th}$) power optimizer in the example of FIGS. 5A and 5B were to fail and did not "dial down" its PV panel pair, this would be mitigated by the bottom most (i.e., $1^{st}$) power optimizer which is independently checking its output voltages and adjusting the settings of the PV panel accordingly.

For brevity, the sequence corresponding to FIGS. 3C and 3D where some of the PV panels subsequently become shaded and the system responds by "dialing up" power generation at unshaded parts of the system is not described herein, but the techniques described in FIGS. 3C and 3D are also applicable here.

As is shown in this example, in some embodiments, the plurality of serially-connected power optimizers includes (1) a first power optimizer at a first distal end of the plurality of serially-connected power optimizers (e.g., the $8^{th}$ power optimizer associated with Vindv8 (528a and 528b) in FIGS. 5A and 5B) and (2) a second power optimizer at a second distal end of the plurality of serially-connected power optimizers (e.g., the $1^{st}$ power optimizer associated with Vindv1 (521a and 521b) in FIGS. 5A and 5B); and adjusting the corresponding photovoltaic panel in the plurality of photovoltaic panels in order to reduce the individual voltage output and the combined voltage output includes: using the first power optimizer to adjust a first photovoltaic panel in order to reduce a first individual voltage output and a first combined voltage output that are associated with the first power optimizer (see, for example, the changes in Vindv8 (528a and 528b) and Vcomb8+ (514a and 514b) between FIGS. 5A and 5B); and using the second power optimizer to adjust a second photovoltaic panel in order to reduce a second individual voltage output and a second combined voltage output that are associated with the second power optimizer (see, for example, the changes in Vindv1 (521a and 521b) and Vcomb1− (516a and 516b) between FIGS. 5A and 5B).

To avoid any communication between power optimizers and/or (manual) configuration of the power optimizers at installation, the power optimizers in FIGS. 5A and 5B do not necessarily know where they are located within the in-series connection. As such, in some embodiments, the check at 108 in FIG. 1 includes checking both a positive terminal (e.g., Vcomb8+ (514a) in FIG. 5A) as well as a negative terminal (e.g., Vcomb1− (516a) in FIG. 5A) of that power optimizer. The following figure shows an example of a power optimizer that does this.

Figure 6:
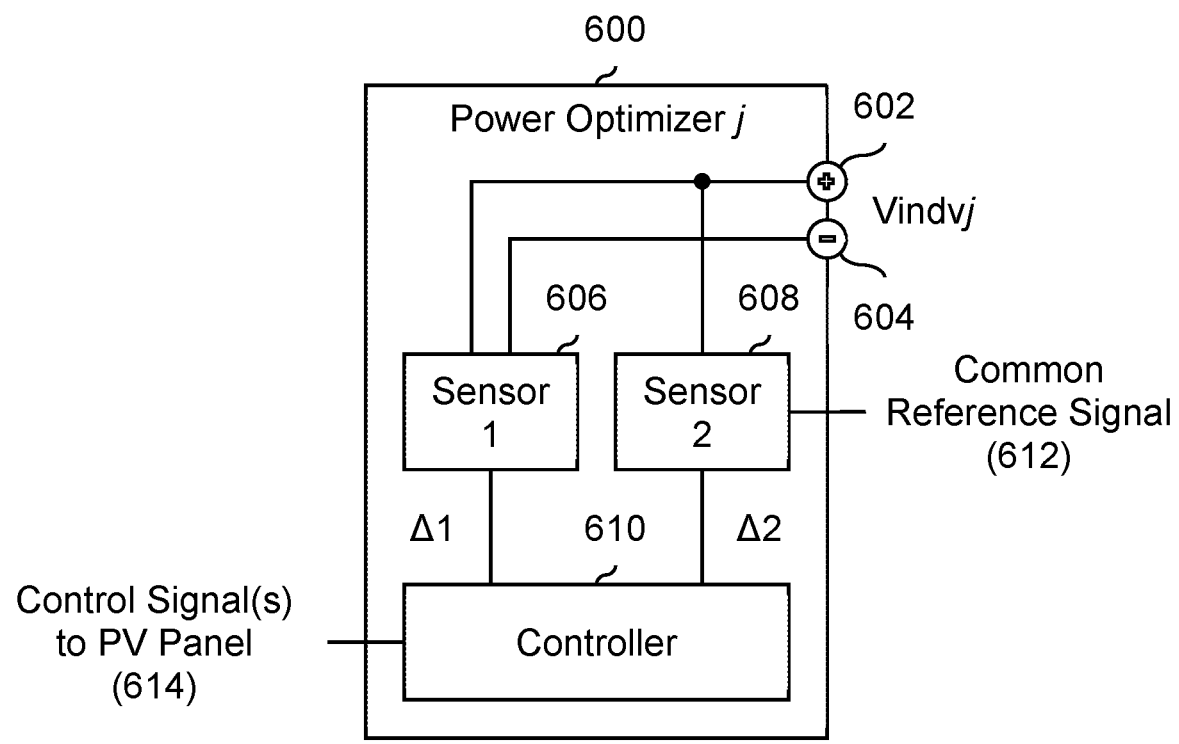
FIG. 6 is a diagram illustrating an embodiment of a power optimizer with two sensors that are used to check both a positive terminal and a negative terminal of that power optimizer.

FIG. 6 is a diagram illustrating an embodiment of a power optimizer with two sensors that are used to check both a positive terminal and a negative terminal of that power optimizer. In some embodiments, the power optimizers (200a and 200b) in FIG. 2 are implemented as shown here.

In this example, a $j^{th}$ power optimizer (600) has a positive (output) terminal (602) and a negative (output) terminal (604). The voltage difference across the two terminals (602 and 604) is the individual voltage output, Vindvj.

A first (e.g., voltage) sensor (606) determines the (e.g., voltage) difference between the positive terminal (602) and the negative terminal (604) and generates a first difference, $\Delta 1$. The first difference (i.e., $\Delta 1$) is passed from the first sensor (606) to the controller (610), which uses the first difference to ensure that the individual voltage output (i.e., Vindvj) does not exceed the individual limit (see, e.g., the check at 104 in FIG. 1).

For example, $\Delta 1 = Vj+ - Vj-$ where Vj+ is the positive terminal (602) and Vj− is the negative terminal (604). The controller checks to ensure that $\Delta 1$ does not exceed the individual limit (e.g., 60V in the examples of FIGS. 3A-3D), otherwise the control signal(s) to the PV panel (614) is/are adjusted to bring the individual voltage output and combined voltage output down. It is assumed that Vj+>Vj− so no absolute value is used in this example.

A second (e.g., voltage) sensor (608) inputs the positive terminal (602) and the common reference signal (612) and determines a second (e.g., voltage) difference (i.e., 42) between the two. One example of the second difference (i.e., 42) in FIG. 5A is the difference between Vcomb8+ (514a) and the common reference signal (504a). The second difference (i.e., 42) is passed from the second sensor (608) to the controller (610) which compares it to the maximum offset (e.g., to perform the check at 108 in FIG. 1).

For example, $\Delta 2 = Vj+ - \text{common\_reference\_signal}$ and the controller (610) checks to ensure that $|\Delta 2|$ does not exceed the maximum offset. In FIG. 5A, Vcomb8+ (514a) is 240V and the DC bus midpoint (which is used as the common reference signal (504b)) is at 0V so $|\Delta 2|$ in that example is 240V which exceeds the maximum offset (506a) of 200V. Depending upon the results of the various checks, the controller (610) will adjust the control signal(s) to its PV panel (614), as or if needed.

In this example, the $j^{th}$ power optimizer (600) does not know where it is in the in-series connection, because to have that information available may require manual programming of the power optimizers and/or communication between power optimizers, which have the vulnerability described above. As such, the $j^{th}$ power optimizer (600) checks both the positive terminal (602) and negative terminal (604) to ensure that they are both within the maximum offset relative to and/or as measured from the common reference signal (e.g., because the $j^{th}$ power optimizer (600) does not know if it is the topmost power optimizer in the chain, the bottommost, one in the middle, etc.). Instead of using a third sensor, however, the controller (610) uses the first difference and second difference from the two sensors (606 and 608) to check the negative terminal (604). For example:

$$\Delta 3 = \Delta 1 - \Delta 2$$

$$\Delta 3 = (Vj+ - Vj-) - (Vj+ - \text{common\_reference\_signal})$$

$$\Delta 3 = \text{common\_reference\_signal} - Vj-$$

The controller (610) then checks to ensure that $|\Delta 3|$ does not exceed the maximum offset. For the $8^{th}$ power optimizer in FIG. 5A, for example, $\Delta 1 = 240V - 180V = 60V$; $\Delta 2 = 240V - 0V = 240V$; and $\Delta 3 = 60V - 240V = -180V$. $|\Delta 3| = 180V$ and does not exceed the maximum offset (506a) of 200V. For the $1^{st}$ power optimizer in FIG. 5A, $\Delta 1 = -180V - (-240V) = 60V$; $42 = -180V - 0V = -180V$; and $43 = 60V - (-180V) = 240V$.

In some embodiments, the controller (610) already implements other functionality and/or features using firmware running on a microprocessor and the calculation of 43 is performed on firmware (e.g., instead of using a third sensor). The additional firmware used to calculate 43 from 41 and 42 may be negligible and worth the tradeoff to avoid a third sensor. It is noted that in some other embodiments, the second sensor (608) would instead receive the common reference signal (612) and the negative terminal (604) as inputs and the general concept would still hold true.

As is shown in this example, in some embodiments, receiving (1) the individual voltage output and (2) the combined voltage output includes receiving a positive terminal signal and a negative terminal signal; said at least one sensor includes: a first sensor that is configured to determine a first difference between the positive terminal signal and the negative terminal signal; and a second sensor that is configured to determine a second difference between: (1) one and only one of the positive terminal signal and the negative terminal signal and (2) the common reference signal; and the controller is configured to determine whether the combined voltage output relative to the common reference signal exceeds the maximum offset, including by: performing a first combined voltage test using the second difference; determining a third difference using the first difference and the second difference; and performing a second combined voltage test using the third difference.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A power optimizer, comprising:
   at least one sensor that is configured to:
      receive a common reference signal, wherein the common reference signal is used by a plurality of serially-connected power optimizers to manage a plurality of photovoltaic panels; and
      receive (1) an individual voltage output and (2) a combined voltage output, wherein the combined voltage output is based at least in part on (a) the individual voltage output and (b) at least one other individual voltage output associated with another power optimizer in the plurality of serially-connected power optimizers; and
   a controller that is configured to:
      determine whether the individual voltage output exceeds an individual limit;
      in the event it is determined that the individual voltage output exceeds the individual limit, adjust a corresponding photovoltaic panel in the plurality of photovoltaic panels in order to reduce the individual voltage output and the combined voltage output;
      determine whether the combined voltage output relative to the common reference signal exceeds a maximum offset; and
      in the event it is determined that the combined voltage output relative to the common reference signal exceeds the maximum offset, adjust the corresponding photovoltaic panel in the plurality of photovoltaic panels in order to reduce the individual voltage output and the combined voltage output.

2. The power optimizer recited in claim 1, wherein the common reference signal includes a ground signal.

3. The power optimizer recited in claim 1, wherein:
   the power optimizer further includes a metal mounting tab that is configured to be bolted to a grounded frame associated with the corresponding photovoltaic panel; and
   the common reference signal includes a ground signal that is received via the metal mounting tab and the grounded frame.

4. The power optimizer recited in claim 1, wherein:
   the power optimizer further includes a screw terminal that is configured to be coupled to a grounding wire; and
   the common reference signal includes a ground signal that is received via the screw terminal and the grounding wire.

5. The power optimizer recited in claim 1, wherein:
   the plurality of serially-connected power optimizers is connected in parallel to a DC bus associated with an inverter included in an energy storage system (ESS); and
   the common reference signal includes a DC bus midpoint associated with the DC bus.

6. The power optimizer recited in claim 1, wherein:
   the plurality of serially-connected power optimizers includes (1) a first power optimizer at a first distal end of the plurality of serially-connected power optimizers and (2) a second power optimizer at a second distal end of the plurality of serially-connected power optimizers; and
   adjusting the corresponding photovoltaic panel in the plurality of photovoltaic panels in order to reduce the individual voltage output and the combined voltage output includes:
      using the first power optimizer to adjust a first photovoltaic panel in order to reduce a first individual voltage output and a first combined voltage output that are associated with the first power optimizer; and
      using the second power optimizer to adjust a second photovoltaic panel in order to reduce a second individual voltage output and a second combined voltage output that are associated with the second power optimizer.

7. The power optimizer recited in claim 1, wherein:
   receiving (1) the individual voltage output and (2) the combined voltage output includes receiving a positive terminal signal and a negative terminal signal;
   said at least one sensor includes:
      a first sensor that is configured to determine a first difference between the positive terminal signal and the negative terminal signal; and
      a second sensor that is configured to determine a second difference between: (1) one and only one of the positive terminal signal and the negative terminal signal and (2) the common reference signal; and
   the controller is configured to determine whether the combined voltage output relative to the common reference signal exceeds the maximum offset, including by:
      performing a first combined voltage test using the second difference;
      determining a third difference using the first difference and the second difference; and
      performing a second combined voltage test using the third difference.

8. A method, comprising:
   providing at least one sensor that is configured to:
      receive a common reference signal, wherein the common reference signal is used by a plurality of serially-connected power optimizers to manage a plurality of photovoltaic panels; and
      receive (1) an individual voltage output and (2) a combined voltage output, wherein the combined voltage output is based at least in part on (a) the individual voltage output and (b) at least one other individual voltage output associated with another power optimizer in the plurality of serially-connected power optimizers; and
   providing a controller that is configured to:
      determine whether the individual voltage output exceeds an individual limit;
      in the event it is determined that the individual voltage output exceeds the individual limit, adjust a corresponding photovoltaic panel in the plurality of photovoltaic panels in order to reduce the individual voltage output and the combined voltage output;
      determine whether the combined voltage output relative to the common reference signal exceeds a maximum offset; and
      in the event it is determined that the combined voltage output relative to the common reference signal exceeds the maximum offset, adjust the corresponding photovoltaic panel in the plurality of photovoltaic panels in order to reduce the individual voltage output and the combined voltage output.

9. The method recited in claim 8, wherein the common reference signal includes a ground signal.

10. The method recited in claim 8, wherein:
the method is performed by a power optimizer that includes a metal mounting tab that is configured to be bolted to a grounded frame associated with the corresponding photovoltaic panel; and
the common reference signal includes a ground signal that is received via the metal mounting tab and the grounded frame.

11. The method recited in claim 8, wherein:
the method is performed by a power optimizer that includes a screw terminal that is configured to be coupled to a grounding wire; and
the common reference signal includes a ground signal that is received via the screw terminal and the grounding wire.

12. The method recited in claim 8, wherein:
the plurality of serially-connected power optimizers is connected in parallel to a DC bus associated with an inverter included in an energy storage system (ESS); and
the common reference signal includes a DC bus midpoint associated with the DC bus.

13. The method recited in claim 8, wherein:
the plurality of serially-connected power optimizers includes (1) a first power optimizer at a first distal end of the plurality of serially-connected power optimizers and (2) a second power optimizer at a second distal end of the plurality of serially-connected power optimizers; and
adjusting the corresponding photovoltaic panel in the plurality of photovoltaic panels in order to reduce the individual voltage output and the combined voltage output includes:
using the first power optimizer to adjust a first photovoltaic panel in order to reduce a first individual voltage output and a first combined voltage output that are associated with the first power optimizer; and
using the second power optimizer to adjust a second photovoltaic panel in order to reduce a second individual voltage output and a second combined voltage output that are associated with the second power optimizer.

14. The method recited in claim 8, wherein:
receiving (1) the individual voltage output and (2) the combined voltage output includes receiving a positive terminal signal and a negative terminal signal;
said at least one sensor includes:
a first sensor that is configured to determine a first difference between the positive terminal signal and the negative terminal signal; and
a second sensor that is configured to determine a second difference between: (1) one and only one of the positive terminal signal and the negative terminal signal and (2) the common reference signal; and
the controller is configured to determine whether the combined voltage output relative to the common reference signal exceeds the maximum offset, including by:
performing a first combined voltage test using the second difference;
determining a third difference using the first difference and the second difference; and
performing a second combined voltage test using the third difference.

* * * * *